United States Patent [19]
Morimanno, Sr. et al.

[11] Patent Number: 5,165,707
[45] Date of Patent: Nov. 24, 1992

[54] VERTICALLY ADJUSTABLE ROLLBAR MECHANISM

[76] Inventors: John P. Morimanno, Sr.; John P. Morimanno, Jr., both of 5802 State Rd. 101 N., Woodburn, Ind. 46797

[21] Appl. No.: 685,742

[22] Filed: Apr. 16, 1991

[51] Int. Cl.⁵ ............................................. B60R 21/13
[52] U.S. Cl. ..................................... 280/756; 414/914
[58] Field of Search ......................... 280/756; 414/914

[56] References Cited

U.S. PATENT DOCUMENTS

| | | | |
|---|---|---|---|
| 2,962,179 | 11/1960 | Molitor et al. | 414/914 X |
| 4,557,502 | 12/1985 | Scaduto et al. | 280/756 |
| 4,666,183 | 5/1987 | Azzarello | 280/756 |
| 4,783,097 | 11/1988 | Browning et al. | 280/756 |
| 4,795,188 | 1/1989 | Dueker | 280/756 |
| 4,840,398 | 6/1989 | Matthias et al. | 280/756 |
| 4,900,058 | 2/1990 | Hobrecht | 280/756 |
| 5,000,480 | 3/1991 | Straka et al. | 280/756 |
| 5,066,040 | 11/1991 | Dangl et al. | 280/756 |

Primary Examiner—David H. Bollinger

[57] ABSTRACT

A rollbar mechanism for installation in the cargo box of a pick-up truck. The mechanism includes a vertically slidable crosspiece movable between a raised position above the cab roof line and a lowered position below the cab roof line. A fluid-operated power unit is mounted in the cargo box for raising or lowering the cross piece.

5 Claims, 1 Drawing Sheet

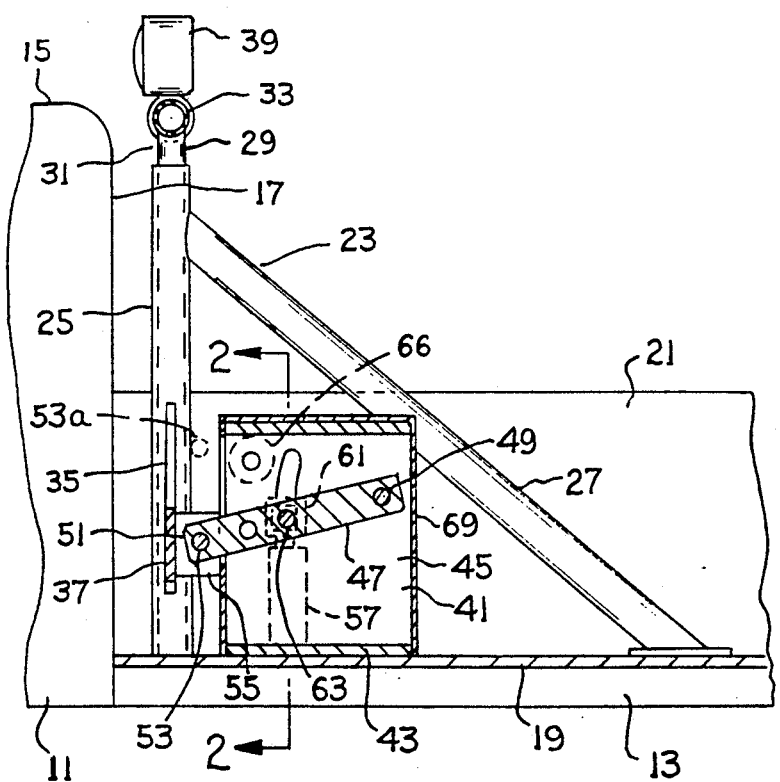
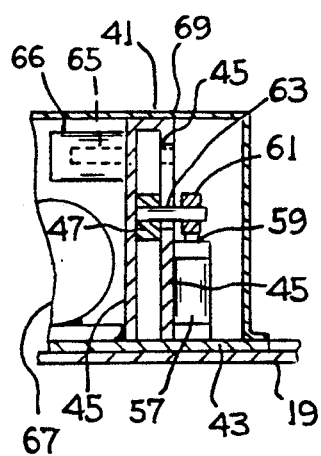
FIG. 1
FIG. 2

VERTICALLY ADJUSTABLE ROLLBAR MECHANISM

BACKGROUND AND SUMMARY OF THE INVENTION

This invention relates to roll bars used on pick up trucks to prevent a catastrophic crushing action on the roof of the truck cab in the event of a rollover accident. Such roll bars include crosspieces extending horizontally behind the cab at or slighyly above the roof plane. In some cases external lights are mounted on the crosspieces to provide forward night vision beyond the zones covered by conventional headlights (which are considerably closer to the ground than the elevated lights on the roll bar).

Under some circumstances it may be desirable to lower the roll bar, e.g. to protect the overhead lights from contact with low hanging branches of trees near the path being taken by the truck.

The present invention relates to a retractable rollbar mechanism that can have a raised position wherein the crosspiece is elevated above the roof plane, or a lowered position wherein the crosspiece is below the roof plane. The mechanism includes a fluid-operated power unit installable on the bed (bottom wall) of the truck cargo box. The output member of the power unit is operatively connected to a vertically movable portion of the rollbar mechanism for raising or lowering purposes.

THE DRAWINGS

FIG. 1 is a fragmentary sectional view through a pickup truck having a rollbar mechanism of the present invention installed thereon.

FIG. 2 is a sectional view taken on line 2—2 in FIG. 1.

DESCRIPTION OF A PREFERRED EMBODIMENT OF THE INVENTION

The drawings fragmentarily show a conventional pick up truck having a cab 11 and cargo box 13. The cab has a roof 15 and rear wall 17. The cargo box has a horizontal bed (bottom wall) 19 and two upstanding side walls 21.

The invention concerns a rollbar mechanism designated generally by numeral 23. The mechanism includes two upstanding vertical sleeves 25 located a few inches behind the cab rear wall 17 and relatively close to the cargo box side walls 21. Each vertical sleeve is braced by an angulated tubular strut 27 extending within box 13 alongside the associated side wall 21. FIG. 1 is a sectional view taken through the longitudinal midplane of the truck, and therefore only one of the vertical sleeves 25 and one of the angulated struts 27 is visible in FIG. 1.

Each sleeve 25 acts as an upstanding guide for a tubular slide member 29 that forms part of a U-shaped rollbar 31. The rollbar further includes a horizontal cross piece 33 having its opposite ends connected to vertical tubes 29. Each guide sleeve 25 has a vertical slot 35 in its side surface for freely accommodating a horizontal beam 37 that extends between the two tubular side members 29. With this arrangement a vertical force can be applied to beam 37 for raising or lowering the rollbar; beam 37 forms part of the rollbar device.

The rollbar is shown in a lowered position wherein crosspiece 33 is slightly below the level of the cab roof 15. By exerting an upward vertical force on beam 37 it is possible to raise the rollbar to a position wherein crosspiece 33 is slightly above the level of roof 15. Such an operation serves to elevate the lights 39 that are carried on crosspiece 33. Usually there are two lights at spaced points along crosspiece 33.

A fluid-operated power unit 41 is mounted on bed 19 of the cargo box for raising or lowering rollbar 31. The power unit includes a relatively thick base plate 43 bolted to bed 19, and two spaced parallel plates 45 extending upwardly from the base plate. A flat-faced lever 47 of bar-like construction is arranged between plates 45 for swinging motion in a vertical arc around a transverse pivot pin 49 that extends through plates 45 and the lever. Upstanding plates 45 form a hollow stanchion that guides lever 47 against twisting or wobbling while it is swinging upward around the axis of pin 49. The left end of lever 47 has a pivotal connection 51 with beam 37 at its midpoint, i.e. on the longitudinal centerline of the vehicle. Pivotal connection 51 is shown as a transverse pin 53 extending through the lever, and two slotted arms 55 extending from beam 37 along opposite side faces of the lever. End portions of pin 53 are located within the slots in arms 55 to form a pivotal connection between the lever and the beam.

A vertically oriented hydraulic cylinder 57 is mounted on one of the upstanding plates 45. The cylinder has a piston rod 59 that carries a yoke 61 in encircling relation to a pin 63 that extends from lever 47 through an arcuate slot in the associated plate 45. Introduction of pressurized hydraulic fluid into the lower end of cylinder 57 enables piston rod 59 to raise lever 47 to a position wherein pin 53 is in dashed line position 53a. This position corresponds to the raised position of rollbar 13.

Hydraulic cylinder 57 is preferably a low cost light gage structure that is effective for raising lever 47 and beam 37 to the raised position. However, cylinder 57 would ordinarily not be strong enough to withstand the heavy "rollover" forces that might be transmitted through rollbar 31 in an accident situation. In order to support lever 47 in its raised position there is provided a transverse pin 65 that forms part of an armature for electrical solenoid 66. Pin 65 is supported for motion through aligned holes in upstanding plates 45. After lever 47 has been swung upwardly to its raised position the solenoid is actuated to drive pin 65 rightwardly (FIG. 2) through an opening in the lever into the aligned hole in the rightmost plate 45. Load forces are transmitted from lever 47 through pin 65 into plates 45. The plates are constructed to withstand heavy load forces.

A conventional motor-pump assembly will be used to supply hydraulic fluid to cylinder 57. The motor-pump assembly is fragmentarily shown at 67 in FIG. 2. The entire apparatus is preferably enclosed in a sheet metal housing referenced by numeral 69. The housing and enclosed apparatus are mounted on base plate 43 to facilitate shipment and easy installation on the bed of the cargo box. It is necessary to form a vertical slot in one wall of housing 69 to accommodate swinging motion of lever 47.

Electric power is preferably taken from the vehicle electrical system. The necessary manual switches for the pump motor and solenoid 66 may be mounted on the vehicle dashboard or on housing 69.

What is claimed is:

1. A rollbar mechanism installable in the cargo box of a pick-up truck, comprising two laterally-spaced upstanding guide members; a U-shaped roll bar that includes a horizontal cross piece and two depending slide members extending from the ends of said cross piece downwardly within the upstanding guides; a horizontal beam extending between said slide members in the space below the horizontal cross piece; and a fluid-operated power unit installable on the bed of the truck cargo box; said power unit comprising a base plate positionable flatwise on the cargo box bed, a stanchion extending vertically upwardly from said base plate, a lever having one end thereof pivotably connected to the stanchion and the other end thereof pivotably connected to said horizontal beam at the midpoint of the beam whereby swinging motion of the lever is effective to raise or lower the U-shaped roll bar, and a hydraulic cylinder extending upwardly from said base plate alongside the stanchion, said hydraulic cylinder having a piston connected to the lever for swinging said lever in a vertical arc around its connection point with the stanchion, whereby the beam is raised or lowered.

2. The mechanism of claim 1, and further comprising a support pin slidably supported on the stanchion for movement crosswise of the lever; and solenoid means for moving the support pin back and forth across the path of the lever, whereby said pin is enabled to support the lever in its raised position.

3. The mechanism of claim 1, wherein said stanchion comprises two parallel flat plates spaced part to provide an intervening travel space for said lever; said lever having its side surfaces slidably engaged with the flat plates, whereby the plates act as guides for the lever.

4. The mechanism of claim 3, and further comprising a solenoid mounted on one of the flat plates; said solenoid having an armature that includes a pin extendable through aligned holes in the plates; said lever being swingable to a raised position wherein the pin can project through the lever to support said lever in its raised position.

5. The mechanism of claim 1, wherein each upstanding guide member is a vertical sleeve; each depending slide member comprising a tube telescoped into one of the vertical sleeves; each sleeve having a vertical slot in its side surface for accommodating vertical motion of said horizontal beam.

* * * * *